United States Patent
Zanarella

(10) Patent No.: US 12,103,283 B2
(45) Date of Patent: Oct. 1, 2024

(54) CLOSURE MEMBER FOR A FOOD CONTAINER AND METHOD OF MANUFACTURING OF SAID CLOSURE MEMBER

(71) Applicant: SMILESYS S.P.A., Milan (IT)

(72) Inventor: Claudio Ernestino Zanarella, Campo San Martino (IT)

(73) Assignee: SMILESYS S.P.A., Milan (IT)

( * ) Notice: Subject to any disclaimer, the term of this patent is extended or adjusted under 35 U.S.C. 154(b) by 1169 days.

(21) Appl. No.: 16/765,772

(22) PCT Filed: Nov. 16, 2018

(86) PCT No.: PCT/IB2018/059026
§ 371 (c)(1),
(2) Date: May 20, 2020

(87) PCT Pub. No.: WO2019/102320
PCT Pub. Date: May 31, 2019

(65) Prior Publication Data
US 2020/0282690 A1    Sep. 10, 2020

(30) Foreign Application Priority Data

Nov. 21, 2017   (IT) .................... 102017000133009

(51) Int. Cl.
*B32B 3/08*    (2006.01)
*B32B 3/26*    (2006.01)
(Continued)

(52) U.S. Cl.
CPC .............. *B32B 3/085* (2013.01); *B32B 3/266* (2013.01); *B32B 7/12* (2013.01); *B32B 27/08* (2013.01);
(Continued)

(58) Field of Classification Search
CPC .......... B32B 3/085; B32B 3/08; B32B 3/266; B32B 27/08; B32B 27/06; B32B 2250/24;
(Continued)

(56) References Cited

U.S. PATENT DOCUMENTS

| | | | | |
|---|---|---|---|---|
| 3,335,939 A | * | 8/1967 | Robinson, Jr. | B65D 77/2056 229/123.2 |
| 4,452,842 A | * | 6/1984 | Borges | B32B 27/08 229/123.1 |
| 4,577,777 A | * | 3/1986 | Brochman | B65D 17/505 220/359.3 |
| 4,589,568 A | * | 5/1986 | Ito | B32B 27/32 220/359.3 |

(Continued)

FOREIGN PATENT DOCUMENTS

| | | | | |
|---|---|---|---|---|
| EP | 322189 A | * | 6/1989 | ......... B29C 47/0019 |
| EP | 461640 A | * | 12/1991 | ............. B32B 27/08 |
| WO | WO-9325375 A1 | * | 12/1993 | ......... B29C 65/3644 |

OTHER PUBLICATIONS

International Search Report dated Mar. 14, 2019 from PCT Application No. PCT/IB2018/059026.

*Primary Examiner* — Robert J Hicks
(74) *Attorney, Agent, or Firm* — SHUTTLEWORTH & INGERSOLL, PLC; Timothy J. Klima

(57) ABSTRACT

A closure member for a food container comprises a multilayer laminate peripherally delimited by its peripheral edge having a predetermined shape suitable for covering an opening of a corresponding container and defining at least one hand gripping portion for a user. The multilayer laminate is provided with a first layer of material, preferably at least partly light permeable, a second layer of preferably plastic material, a third layer of repositionable adhesive material interposed between the first and the second layer and at least one anti-adhesive strip interposed between the first and second layer and placed near the hand gripping portion.

8 Claims, 5 Drawing Sheets

(51) Int. Cl.
  *B32B 7/12* (2006.01)
  *B32B 27/08* (2006.01)
  *B65D 65/40* (2006.01)
  *B65D 77/20* (2006.01)

(52) U.S. Cl.
  CPC ......... *B65D 65/40* (2013.01); *B65D 77/2028* (2013.01); *B32B 2250/24* (2013.01); *B32B 2307/31* (2013.01); *B32B 2307/412* (2013.01); *B32B 2307/414* (2013.01); *B32B 2307/582* (2013.01); *B32B 2307/732* (2013.01); *B32B 2307/748* (2013.01); *B32B 2435/02* (2013.01); *B32B 2439/70* (2013.01)

(58) Field of Classification Search
  CPC ............ B32B 2307/31; B65D 17/4012; B65D 65/40; B65D 77/2028
  USPC ............ 220/359.4, 359.3, 359.2, 359.1, 269, 268, 220/266, 265
  See application file for complete search history.

(56) References Cited

U.S. PATENT DOCUMENTS

| | | | | |
|---|---|---|---|---|
| 4,858,780 | A * | 8/1989 | Odaka | B65D 77/2096 220/359.3 |
| 5,141,126 | A * | 8/1992 | Takata | B65D 77/2056 220/359.3 |
| 5,160,767 | A * | 11/1992 | Genske | B29C 48/185 215/261 |
| 6,056,141 | A * | 5/2000 | Navarini | B65D 77/2044 428/35.8 |
| 2004/0151932 | A1* | 8/2004 | Galloway | B32B 27/08 428/34.7 |
| 2011/0204054 | A1* | 8/2011 | Huffer | B65D 77/2044 220/266 |
| 2014/0263342 | A1* | 9/2014 | Gillespie | B32B 1/00 220/359.3 |
| 2017/0096276 | A1 | 4/2017 | Zanarella | |
| 2017/0259978 | A1 | 9/2017 | Zamora et al. | |
| 2018/0009210 | A1* | 1/2018 | Liebl | B32B 3/30 |
| 2018/0022966 | A1* | 1/2018 | Naik | B65C 9/0006 428/220 |
| 2019/0322906 | A1* | 10/2019 | Smith | B32B 5/32 |

* cited by examiner

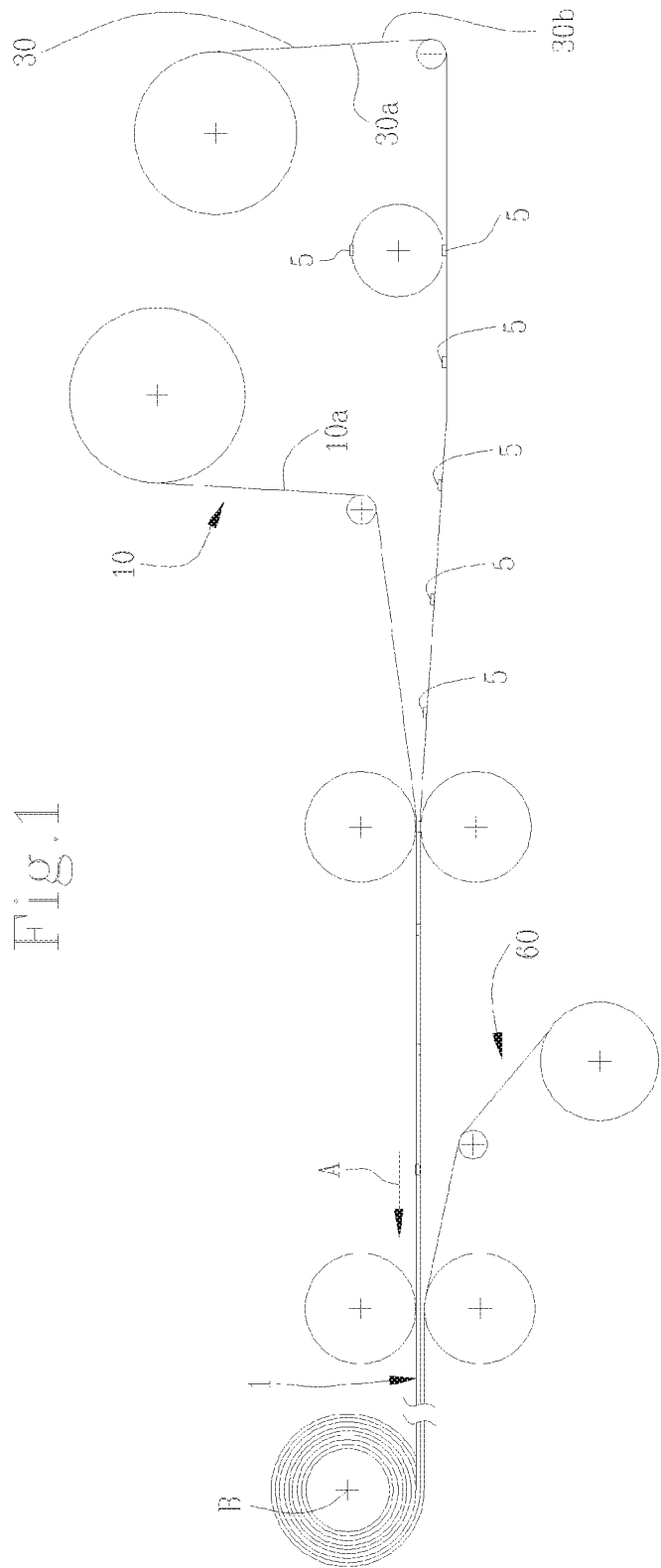

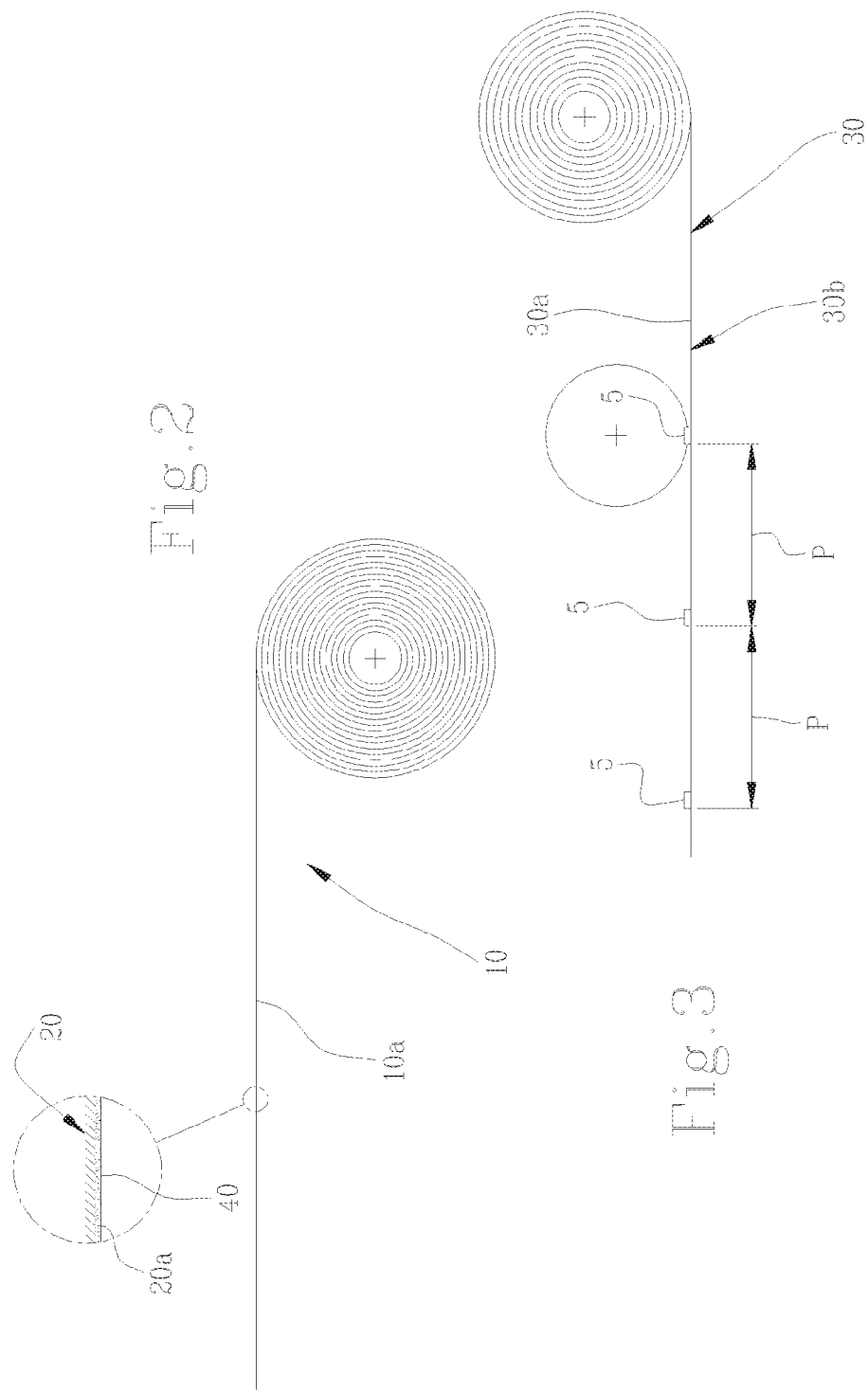

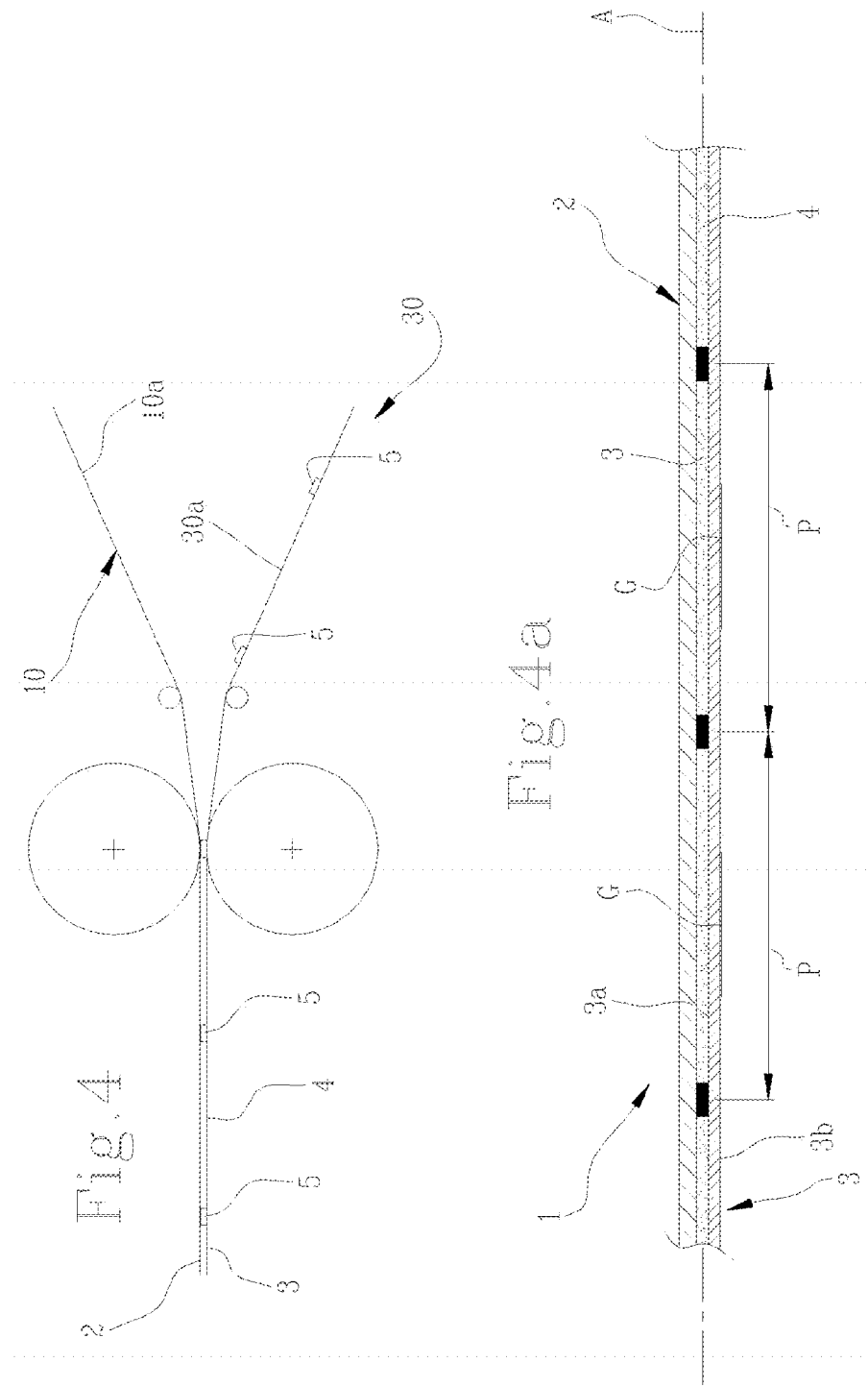

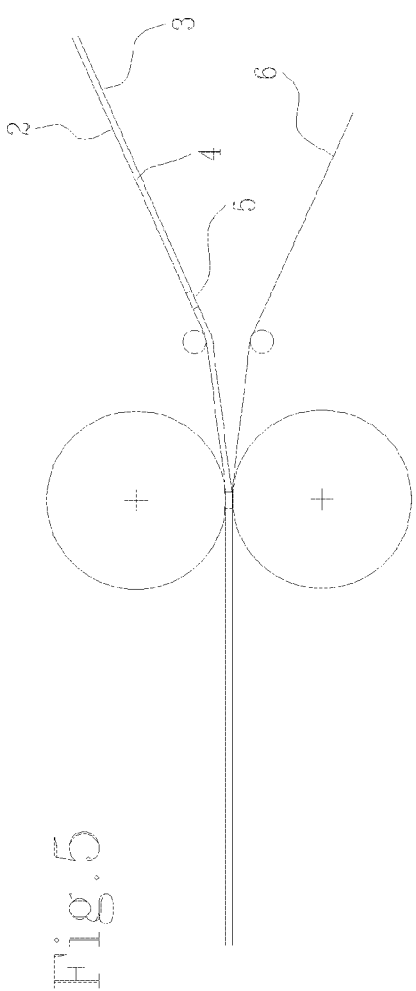
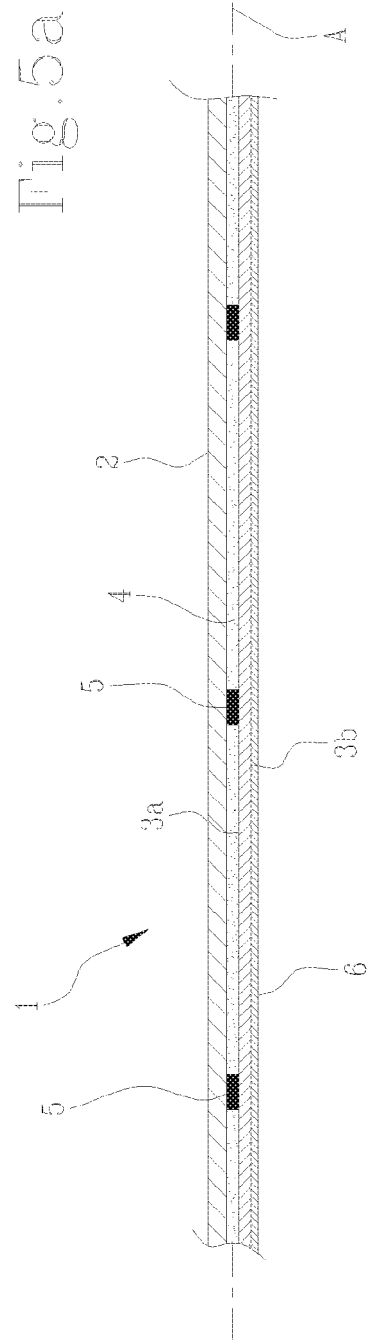

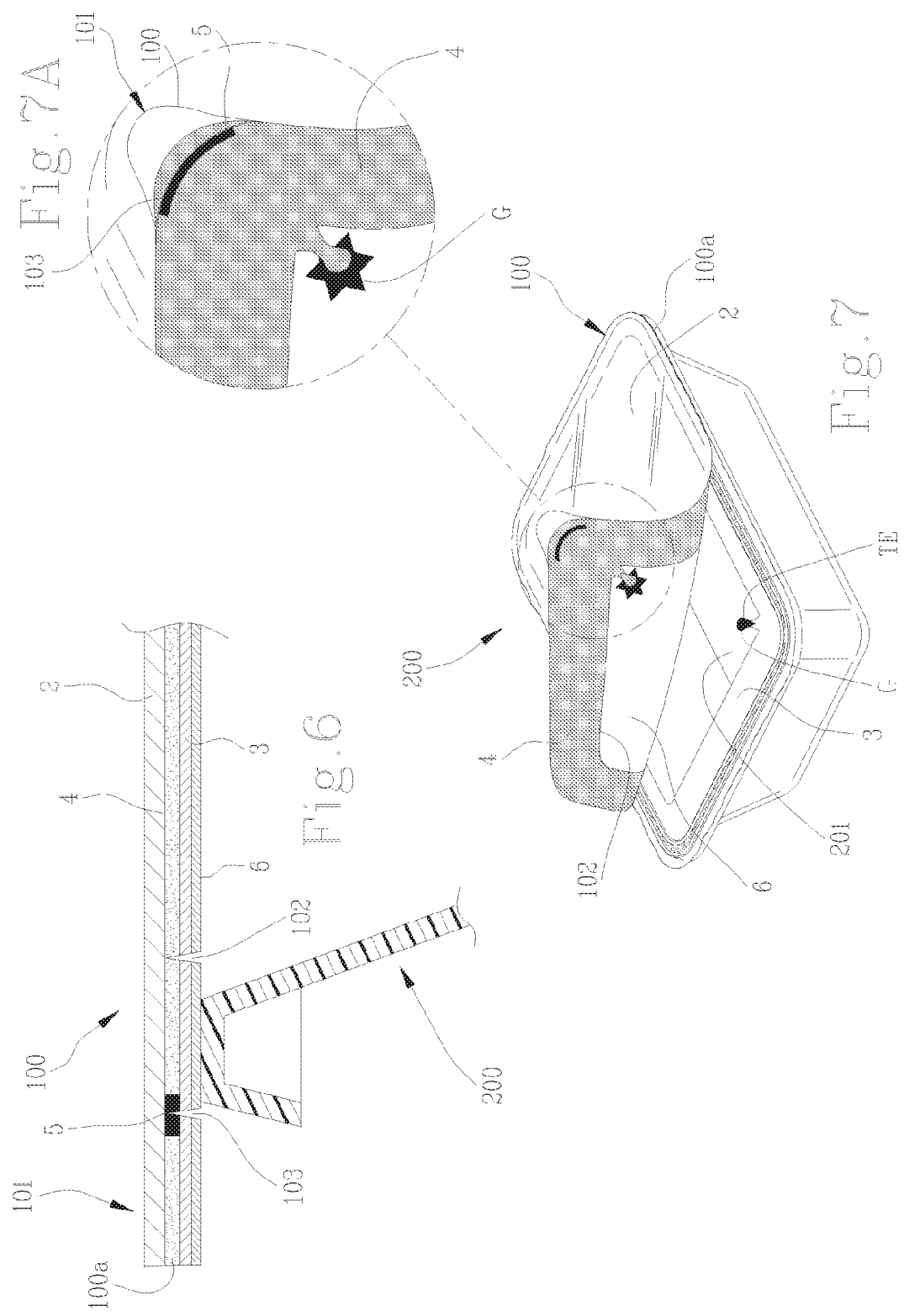

CLOSURE MEMBER FOR A FOOD CONTAINER AND METHOD OF MANUFACTURING OF SAID CLOSURE MEMBER

This application is the National Phase of International Application PCT/IB2018/059026 filed Nov. 16, 2018 which designated the U.S.

This application claims priority to Italian Patent Application No. 102017000133009 filed Nov. 21, 2017, which application is incorporated by reference herein.

The present invention relates to a multilayer laminate for food packaging, a closure member for a food container, as well as a method of manufacturing of said laminate and said closure member.

In particular, the laminate and the closure member which is the object of the present invention are mainly used in the production of repositionable closure films, typically used for closing food trays.

Therefore, the main field of application of the present invention is that of food packaging, but the same type of laminate could also be applied in other sectors in which it is necessary to provide a particularly effective and reduced cost reclosable film.

With specific reference to the food industry, in the prior art multilayer closure films are commonly used, which have a base layer, usually at least partly made of sealing material, on which a (printed) ribbon is positioned.

To guarantee the sealing and the repositioning of the printed ribbon, a "repositionable" adhesive is interposed between the two layers, which is able to guarantee a predetermined number of openings/closures of the container without losing the tightness of the coupling.

One of the problems that have always been associated to these laminates is related to the difficulty of opening them, consider, e.g., the trays used to close fresh products or sausages, which, most often, require a great user effort and, sometimes, it is necessary to damage the film to allow access to the compartment of the container (with irretrievable loss of the seal).

In order to overcome this problem, the prior art proposes a solution in which, during the repositionable adhesive distribution, some longitudinal film strips (i.e. extending in the film winding direction) are left without adhesive; using these areas as a reference, the geometry of the covering will then be die cut, making sure that they fall close to the notches suitable to allow (facilitate) the lifting of the printed layer.

However, such embodiment, while being efficient in terms of easy opening, carries several drawbacks both in terms of production flexibility and visibility of the warranty seal (i.e., anti-tampering).

In fact, the need to make long adhesive-free strips on all the length of the film, besides leading to the production of high material wastage, makes the production of the laminate advantageous only for large production sizes and lots having dimensions not always consistent with the customer needs.

The object of the present invention is to provide a multilayer laminate for food packaging, a closure member for food containers and a method of manufacturing of said laminate and said closure member which overcome the drawbacks of the prior art mentioned above.

In particular, the object of the present invention is to provide a method of manufacturing a multilayer laminate and a method of manufacturing of a closure member for a food container which are highly versatile.

Furthermore, it is the object of the present invention to provide a multilayer laminate for food packaging and a closure member for a food container which are easy to open (peeling).

Moreover, the object of the present invention is to provide a reclosable closure member for a food container and a method of manufacturing thereof which facilitate the displaying, by a user, of any possible tampering.

Said objects are achieved by a reclosable closure member for a food container having features as disclosed herein.

In particular, the closure member comprises a multilayer laminate having a first layer of material at least partly light permeable, a second layer of plastic material and a third layer of repositionable adhesive material interposed between said first and said second layer.

According to an aspect of the present invention, the laminate comprises a plurality of anti-adhesive strips sequentially arranged and spaced apart from each other along said main direction, wherein each anti-adhesive strip is interposed between the first layer and the second layer.

Advantageously, the anti-adhesive strips can be placed locally, preferably in register, which gives the manufacturer maximum operating versatility.

It should be noted that, the second layer has a predetermined graphic pattern printed or formed on at least one of its faces.

The closure member therefore comprises the laminate described above, suitably die cut so as to be peripherally delimited by a peripheral edge having a predetermined conformation suitable for covering an opening of a corresponding container and defining at least one hand gripping portion for a user.

More precisely, the laminate comprises a first layer of material, preferably at least partly light permeable, a second layer of preferably plastic material, a third layer of repositionable adhesive material interposed between said first and said second layer and at least one anti-adhesive strip interposed between the first and second layer and placed near said hand gripping portion.

It should be noted that at least one adhesive strip is placed near said hand gripping portion.

Then, the closure member has at least one inner weakening line, far from the peripheral edge, obtained on said second layer and extending according to a predetermined defining geometry, in use, an access gap to the container and at least one outer weakening line, proximal to the peripheral edge, obtained on said second layer and placed at said anti-adhesive strip In other words, the anti-adhesive strip is placed astride the outer weakening line.

Advantageously, in this way it is possible to provide, in register, an anti-adhesive strip capable of giving a greater tolerance to the production process of the closure member, effectively guaranteeing the correct opening of the container even if the outer weakening line is not perfectly located with respect to the strip welded to the edge of the container.

Preferably, moreover, the predetermined graphic pattern of the second layer extends at least partly astride said inner weakening line to define a tamper-evident tab.

Advantageously, in this way it is easy to introduce a particularly reliable "tamper evidence", required by most manufacturers nowadays.

Moreover, the above mentioned objects are achieved by a method of manufacturing of a closure member for a food container having features as disclosed herein.

Preferably, such method provides for providing a first film of plastic material at least partially light permeable having at least one adhesive face covered by a layer of repositionable adhesive material.

A second film of plastic material having a first and a second face and having a graphic pattern printed on said first or said second face is also provided.

The first and/or the second film are advanced along respective main directions.

According to an aspect of the invention, a discrete application of a plurality of anti-adhesive strips is performed on said first face of the second film or on said adhesive face of the first film.

Preferably, the strips are sequentially arranged and spaced apart along the respective main direction.

This application step is carried out upstream to the coupling between the adhesive face of the first film and the first face of the second film to realize said multilayer laminate.

Advantageously, therefore, the anti-adhesive strips are applied locally on a surface completely covered with adhesive, with great benefit for the operational flexibility and maximizing the "useful" fraction of the film (i.e. limiting the wastages).

Once this laminate has been realised, it is then possible to realise the closure member for a food container.

Such method envisages to provide the laminate previously described, which is the object of the present invention, and to realise:
- at least one inner weakening line formed on said second layer and extending according to a predetermined geometry; and
- at least one outer weakening line formed on said second layer and placed at said anti-adhesive strip.

Furthermore, in order to adapt the closure member to the container geometry, a laminate notch is provided according to a perimeter having a peripheral edge surrounding said weakening lines and provided with at least one hand gripping portion for a user, wherein at least at said hand gripping portion the inner weakening line is far from the peripheral edge with respect to said outer weakening line.

Advantageously, in this way it is possible to easily and quickly produce closure members of any geometry and provided with a reliable opening (or peeling) system.

Further innovative aspects of the present invention, alternative or complementary to each other, can be found among the following.

The anti-adhesive strips are preferably positioned between the second and third layer. Therefore, preferably, each anti-adhesive strip is applied to the second layer and subsequently applied/coupled to the third layer (in turn preferably already coupled to the first).

Preferably, once coupled, the second layer of the laminate has a first face covered by said repositionable adhesive and a second face, opposite the first one, having said printed graphic pattern.

The anti-adhesive strips are preferably printed on the first face of the second ribbon, i.e., on the first face of the second film.

More preferably, the anti-adhesive strips are printed or applied in register on such face, so as to maximize the operational flexibility of the manufacturer.

Further technical features and the related benefits of the invention will become more apparent from the following exemplary, and therefore non-limiting description of a preferred, and therefore not exclusive embodiment of multilayer laminate for food packaging and a method of manufacturing of said laminate as shown in the attached drawings, wherein:

FIG. 1 shows a schematic view of a plant implementing the method of manufacturing of a multilayer laminate for food packaging according to the present invention;

FIGS. 2-5*a* schematically show a succession of steps of the method of FIG. 1 with related details of the laminate.

FIG. 6 schematically shows a sectional view of a closure member for a food container according to the present invention in a first condition of use;

FIG. 7 shows a perspective view of a closure member for a food container according to the present invention in a second condition of use.

With reference to the appended figures, number 1 indicates a multilayer laminate for food packaging according to the present invention.

Such laminate 1 is as said "multilayer", i.e., it is constituted by a plurality of individual layers suitably coupled and superimposed on each other in order to define an individual windable material or film.

It should be noted, in fact, that the laminate 1 is a windable material extending along its own main direction "A", or wrapping direction.

Preferably, furthermore, the laminate 1 is stored in film coils B wrapped around a central axis perpendicular to the main direction "A".

Such laminate 1 comprises a first layer 2 made of a material at least partially light permeable; said first layer 2 is, in use, a top layer and has at least one portion light permeable (i.e. transparent or translucent) which allows the displaying of at least one successive layer.

The first layer 2 is preferably made of PET or alternatively, e.g., of polypropylene or polyamide.

Preferably, moreover, the first layer has a thickness ranging between 5 and 80 μm, more preferably between 10 and 50 μm.

In this regard, the laminate comprises in fact a second layer 3 of plastic material.

Preferably, such second layer 3 has a predetermined graphic pattern "G" printed or formed on at least one of its faces 3*b*.

In the preferred embodiment, the second layer 3 has a first 3*a* and a second face 3*b*; the graphic pattern "G" being realised on said second face 3*b*. Preferably, the graphic pattern is printed on the second face, e.g., with flexography, rotogravure, offset, screen printing, or digital printing.

Note that the graphic pattern "G" can be any graphic, ornamental or functional representation.

"Functional" graphic representation refers herein to the "register" or reference nicks which are also realised on completely transparent laminates to allow subsequent die cutting or carving processing.

Therefore, it is not necessary that on the second layer 3 there are invasive or ornamental representations, but it is sufficient that on one of its faces the nicks or references useful for subsequent processing are reported to define them as a "graphic pattern" according to the present description.

In the preferred embodiments, the second layer 3 is made, e.g., of polyester, polyamide, polypropylene or even aluminum.

Preferably, such second layer 3 has a thickness ranging between 1 and 50 μm, more preferably between 5 and 30 μm.

Preferably, moreover, it is provided the presence of a third layer 4 made of a repositionable adhesive material interposed between the first layer 2 and the second layer 3.

In particular, the third layer 4 is coupled to the first face 3a of the second layer 3.

Such third layer 4 is therefore interposed between the first layer 2 and the first face 3a of the second layer 3.

The second face 3b of the second layer 3, having the graphic pattern "G", is facing away from the first layer 2.

In other words, the first face 3a of the second layer 3 is covered by said repositionable adhesive (i.e. coupled to the third layer 4), while the second face 3b has the graphic pattern "G".

Advantageously, in this way when the first and the second layers are separated (e.g., during the opening of a container), there is no risk that the adhesive "tears" or damages the graphic pattern "G".

It should be noted that "repositionable adhesive material" refers to an adhesive which, by its own characteristics or by interaction with the materials of the other two layers, allows to couple together and uncouple the two layers from each other for a predetermined number of times while maintaining its "binding" (i.e. not dry) capacity. Substances of this type are typically used in the realisation of adhesive/self-adhesive ribbons.

For example, the repositionable adhesive material could be acrylic-based glue.

According to an aspect of the present invention, the laminate 1 comprises a plurality of anti-adhesive strips 5 sequentially arranged and mutually spaced apart along the main direction "A".

It should be noted that the anti-adhesive strips 5 can also be arranged on several transversal (to the main direction "A") rows spaced apart from each other.

Each strip, in any case, is interposed between the first 2 and the second layer 3.

Preferably, the anti-adhesive strips 5 are positioned between the second 3 and the third layer 4 (i.e. between the adhesive material and the "inner" in use layer of the laminate).

It should be noted that "anti-adhesive strip" refers herein to a localized portion of anti-adhesive material which is applied above the second layer 3 (or on the first layer 2), without necessarily conferring an elongated or oblong conformation to the same (however preferable).

Preferably, the anti-adhesive strips 5 are at least partly defined by a flap of anti-adhesive resin locally distributed on the second layer 3.

For example, with "anti-adhesive resin" a silicone trace or non-stick resin is identified.

In a further alternative, however, the anti-adhesive strip could also be defined by a tape of non-stick material deposited on the second layer 3.

Preferably, the anti-adhesive strips 5 (or rows of strips 5) are spaced apart, along the main direction "A", with a constant pitch "p".

In the preferred embodiment, the laminate 1 comprises a further layer 6 made of sealing material coupled to the second layer 3 on the opposite side with respect to the first layer 2.

In other words, the further layer 6 of sealing material is coupled with the second face 3b of the second layer 6 (i.e., the one bearing the graphic pattern "G").

The further layer 6 of sealing material is preferably made of polythene, polypropylene, polyester, aluminum, paper or a material coated with heat-sealing lacquers.

The function of such further layer 6 is to allow the adhesion/coupling of the laminate with a containment body (e.g., a tray) by heat-sealing.

It should be noted that, in some embodiments, the second layer 3 and the further layer 6 are integrated into a single layer of material.

Thanks to the laminate 1 described hitherto, it is possible to realise a closure member for a food container which, in the figures, is indicated by the number 100 (FIGS. 6 and 7).

Such laminate is in fact notched so as to be peripherally delimited exactly by one of its peripheral edge 100a having a predetermined conformation adapted to occlude an opening 201 of a corresponding container 200.

The conformation of the closure member 100 is therefore defined by the die cutting of the laminate and is variable according to the conformation of the container.

In any case, the peripheral edge 100a is shaped so as to define at least one hand gripping portion 101 for a user. Typically, the hand gripping portion 101 is defined by a tab laterally projecting with respect to the edge of the container, but it can also be realised in another way.

At least one of said plurality of anti-adhesive strips 5 is placed near the hand gripping portion 101.

According to an aspect of the invention, the laminate 1 is then notched with a plurality of weakening lines suitable to allow the opening of the container and, preferably, to allow the repositioning thereof.

Such weakening lines are in fact non-through notches which pass through the second layer 3 (and the further layer 6, when present) until reaching the repositionable adhesive layer 4, without engraving the first layer 2.

With such a conformation, therefore, the weakening lines favour the delamination between the first 2 and the second layer 3 when the user "pulls" the closure member at the hand gripping portion 101.

In particular, at least one inner weakening line 102, far from the peripheral edge 100a, formed on the second layer 4 and extending according to a predetermined geometry defining, in use, an access gap to the container is then provided.

Moreover, according to an aspect of the invention, there is also an outer weakening line 103, proximal to the peripheral edge 100a, obtained on said second layer 4 and placed at said anti-adhesive strip 5.

More precisely, the anti-adhesive strip 5 extends astride the outer weakening line 103.

Advantageously, in this way the anti-adhesive strip 5 defines a tolerance buffer for delamination, favouring the separation between the first 2 and the second layer 3 even in the case of not perfect positioning between the portion of a closure member welded to the container (second layer 3 or further welding layer 6) and the outer weakening line 103.

Preferably, moreover, the predetermined graphic pattern "G" of the second layer 3 extends at least partly astride the inner weakening line 102 to define a tamper-evident tab "TE" (see FIG. 7).

Therefore, since the graphic pattern "G" is separated into two distinct parts by the inner weakening line 102 at the opening of the closure member 100, it is not possible to completely recompose it at the reclosing of the same.

In this way, without the need to provide external elements, the tamper-evident tab "TE" is an integral part of the closure member 100 and of the laminate 1 already during production step.

A further object of the present invention is, as mentioned, a method of manufacturing of a laminate for food packaging, preferably but not exclusively of the type described hitherto.

The method envisages to provide, preferably in a coil form, a first film 10 made of plastic material at least partially light permeable having at least one adhesive face 10a.

Therefore, said first film 10 comprises a ribbon 20 made of plastic material having at least one face 20a covered by a layer 40 made of repositionable adhesive material.

It should be noted that the first film 10 could be defined by a self-adhesive ribbon already provided and having the layer 40 made of repositionable adhesive material or, in some other embodiments, it could be realised in-line.

In such latter embodiments, the ribbon 20 made of plastic material at least partially light permeable is provided and subsequently, on its face 20a, the layer 40 made of adhesive material is applied.

Once the ribbon 20 and the layer 40 have been coupled to realise the first film 10, they respectively define the first 2 and the third layer 4 of the laminate 1 described above.

Therefore, the ribbon 20 is preferably made of PET or alternatively, e.g., of polypropylene or polyamide. Preferably, moreover, such ribbon 20 has a thickness ranging between 5 and 80 µm, more preferably between 10 and 50 µm.

Likewise, the layer 40 of repositionable adhesive material could be realised, similarly to what stated above, with acrylic-based glue.

Returning to the method, it then envisages to provide a second film 30 of plastic material having a first face 30a and a second face 30b.

Preferably, the second film 30 has a graphic pattern "G" on at least one of the faces (the first 30a or the second 30b).

In the preferred embodiment, the graphic pattern "G" is coupled to the second face 30b.

Therefore, such second film 30 defines the second layer 3 of the laminate 1 previously described.

It should be noted that, similarly to the first film 10, the second film 30 could also be provided already printed or, alternatively, realised in-line.

In such second alternative, the method would envisage to provide a ribbon of plastic or polymeric material advancing it inside a printing device (not shown) to realise the second film 30.

Once the first 10 and the second film 30 have been provided, these films are advanced along respective main directions "A".

The first 10 and the second film 30 are then advanced until overlapping each other so that they are facing each other and substantially parallel.

During the advancement of the first 20 or second film 30, a plurality of anti-adhesive strips 5 is applied in a discrete (non-continuous) manner on the first face 30a of the second film 30 or on the adhesive face 10a of the first film 10.

With regard to the definition of "anti-adhesive strip", please refer to what previously illustrated above in this regard.

Preferably, the anti-adhesive strips 5 are applied on the first face 30a of the second film 30.

The step of applying the anti-adhesive strips 5 preferably provides for arranging such strips 5 arranged sequentially and spaced apart along the respective main direction "A".

In other words, the strips 5 are applied "in pitch" so that each strip is spaced apart from the next one along the advancement direction of the film 10, 30.

Preferably, the anti-adhesive strips 5 (or the rows/arrays of strips) are deposited or applied on the respective face 10a, 30a, spacing them with a constant pitch "p".

It should be noted that the strips 5 could also be applied in rows or arrays transverse to the advancement direction of the film 10, 30; in this case each strip of a row would be spaced, along the advancement direction, by the corresponding strip 5 of the next row or array.

The application of each strip 5 preferably provides for printing the anti-adhesive strip 5 on the first face 30a of the second film 30.

The strips are therefore applied "in register", being able to simply modify the shape, the pitch and the position modifying the conformation or the positioning of the printing or applicator plates.

Once the strips 5 have been applied, the method involves coupling the first 10 and the second film 30 together.

In particular, the adhesive face 10a of the first film 10 is superimposed and coupled with the first face 30a of the second film 30.

Preferably, such films are mutually coupled by means of a calendar or the like, in order to realise a multilayer laminate, preferably corresponding to the laminate 1 previously described and which is also an object of the present invention.

In this regard, preferably the method provides for a further step sequence.

Such further sequence envisages to provide a step of a further film 60 of sealing material and coupling such further film 60 with the second face 30b of the second film 30.

It should be noted that this step could be performed in-line, either before or after the application of strips 5, or off-line.

If it is performed off-line, the coupling between the further film 60 and the second film 30 could take place upstream of the steps described hitherto or downstream.

In the first case (upstream), it would be possible to realise a multilayer film comprising the second film 30 and the further film 60 which would be subsequently coupled with the strips 5 and the first film 10.

In the second case (downstream), the further film 60 could be coupled to the already realised laminate (defined by the first film 10, by the second film 30 and by the anti-adhesive strips 5).

The laminate 1 thus produced is then preferably subjected to a further succession of steps, in order to realise the closure member 100 previously described.

Preferably, therefore, on the laminate 1 at least a first engraving is realised on the second film 30, such as to form an inner weakening line 102 and extending according to a predetermined geometry.

In particular, the second film 30 (and preferably also the further film 60) is engraved according to said predetermined geometry, the engraving not affecting the first film 20.

Preferably, the first engraving of the second film 30 takes place along a direction at least partly "in a horseshoe shape", in order to define at least one area which, in use, is the access gap to the container.

In the preferred embodiment, the first engraving passes through the printed pattern "G" of the second film 30, in order to define the tamper-evident tab "TE" previously described.

It is then provided the realisation of at least one second engraving on the second film 30 and at said anti-adhesive strip (5) so as to define an outer weakening line 103. Therefore, the second engraving passes through the anti-adhesive strip 5 (and vice versa).

Moreover, a engraving of the laminate 1 is provided according to a perimeter having a peripheral edge 100a surrounding the weakening lines 102, 103 and provided with at least one hand gripping portion 101 for a user.

At least at said hand gripping portion 101, the inner weakening line 102 is far from the peripheral edge 100a with respect to said outer weakening line 103.

The invention achieves the intended objects and achieves important advantages.

In fact, the provision of a discrete plurality of anti-adhesive strips between the two layers of the laminate greatly facilitates the separation between the two layers and makes the finished product more economical and versatile, since it is no longer necessary to provide adhesive-free longitudinal areas.

Furthermore, the realisation of a laminate with an "inner" printed face together with the appropriate geometry of the inner weakening line makes it particularly easy and effective to create areas/tabs defining the warranty seal, a peculiarity that is particularly appreciated by customers.

The invention claimed is:

1. A closure member for a food container, comprising:
a multilayer laminate peripherally delimited by a peripheral edge having a shape suitable for covering an opening of a corresponding container and defining a hand gripping portion for a user; the multilayer laminate comprising:
   a first layer made of a material at least partially light permeable;
   a second layer;
   a third layer made of a repositionable adhesive material interposed between the first layer and the second layer;
   an anti-adhesive strip is-interposed between the first layer and the second layer and placed near the hand gripping portion;
an inner weakening line defined on the second layer and extending according to a geometry defining, in use, an access gap to the container;
an outer weakening line, defined on the second layer, proximal to the peripheral edge with respect to the inner weakening line at least at the hand gripping portion and placed at the anti-adhesive strip.

2. The closure member according to claim 1, wherein the anti-adhesive strip is positioned between the second layer and the third layer of the multilayer laminate.

3. The closure member according to claim 1, wherein the anti-adhesive strip is at least partly defined by an anti-adhesive resin.

4. The closure member according to claim 1, wherein the multilayer laminate comprises a further layer of sealing material coupled to the second layer on an opposite side with respect to the first layer.

5. The closure member according to claim 1, wherein the second layer of the multilayer laminate has a graphic pattern printed or formed on at least one of the faces thereof.

6. The closure member according to claim 5, wherein the predetermined graphic pattern of the second layer extends at least partly astride the inner weakening line to define a tamper-evident tab.

7. A method for manufacturing of a closure element for a food container, comprising the following steps:
providing a multilayer laminate comprising:
   a first layer made of a material at least partially light permeable;
   a second layer;
   a third layer made of a repositionable adhesive material interposed between the first layer and the second layer;
   an anti-adhesive strip is-interposed between the first layer and the second layer and placed near a hand gripping portion for a user;
making a first incision on the second layer extending according to a geometry to define an inner weakening line;
making a second incision on the second layer at the anti-adhesive strip to define an outer weakening line;
notching the multilayer laminate according to a perimeter having a peripheral edge surrounding the inner and outer weakening lines and including the hand gripping portion for the user, wherein at the hand gripping portion, the inner weakening line is further from the peripheral edge with respect to the outer weakening line.

8. The method for manufacturing the closure element according to claim 7, wherein the second layer includes a graphic pattern formed on a face of the second layer, wherein the step of making the first incision comprises directing the first incision to cross the graphic pattern of the second layer to define a tamper-evident tab.

\* \* \* \* \*